(12) United States Patent
Spandau (10) Patent No.: US 9,131,661 B2
(45) Date of Patent: Sep. 15, 2015

(54) APPARATUS AND METHOD FOR THE SANITARY COLLECTION OF DOG WASTE

(71) Applicant: Jonathan Spandau, Wellington, FL (US)

(72) Inventor: Jonathan Spandau, Wellington, FL (US)

( * ) Notice: Subject to any disclaimer, the term of this patent is extended or adjusted under 35 U.S.C. 154(b) by 0 days.

(21) Appl. No.: 14/578,373

(22) Filed: Dec. 20, 2014

(65) Prior Publication Data

US 2015/0164048 A1   Jun. 18, 2015

Related U.S. Application Data

(63) Continuation-in-part of application No. 14/133,326, filed on Dec. 18, 2013, now abandoned.

(51) Int. Cl.
| | | |
|---|---|---|
| A01K 29/00 | (2006.01) | |
| A01K 23/00 | (2006.01) | |
| E01H 1/12 | (2006.01) | |

(52) U.S. Cl.
CPC ......... *A01K 23/005* (2013.01); *E01H 2001/128* (2013.01)

(58) Field of Classification Search
CPC .............. A01K 23/005; E01H 1/1206; E01H 2001/128; E01H 2001/1286; E01H 2001/1293
USPC ....................................................... 294/1.5
See application file for complete search history.

(56) References Cited

U.S. PATENT DOCUMENTS

| | | | | |
|---|---|---|---|---|
| 4,193,623 | A * | 3/1980 | Forsythe et al. ............... | 294/1.5 |
| 4,852,924 | A * | 8/1989 | Ines .................................. | 294/1.5 |
| 5,269,575 | A * | 12/1993 | Parvaresh ........................ | 294/1.5 |
| 5,971,452 | A * | 10/1999 | Marymor et al. .............. | 294/1.5 |
| 6,123,046 | A * | 9/2000 | Gemeniano ................... | 119/161 |
| 7,188,878 | B1 * | 3/2007 | Kraus ............................. | 294/1.4 |
| 7,356,871 | B2 * | 4/2008 | Heaven ........................ | 15/257.2 |
| 8,550,512 | B2 * | 10/2013 | Jones, Jr. ...................... | 294/1.5 |
| 2003/0085581 | A1 * | 5/2003 | Jemison ........................ | 294/1.4 |
| 2004/0201232 | A1 * | 10/2004 | Borman ........................ | 294/1.5 |
| 2005/0225103 | A1 * | 10/2005 | Hatano ......................... | 294/1.5 |
| 2007/0222240 | A1 * | 9/2007 | Sherman ....................... | 294/1.5 |
| 2009/0102212 | A1 * | 4/2009 | Casper ........................... | 294/1.4 |
| 2011/0272955 | A1 * | 11/2011 | Zidulka et al. ................. | 294/1.5 |
| 2011/0291432 | A1 * | 12/2011 | Machado ...................... | 294/1.3 |
| 2012/0049548 | A1 * | 3/2012 | Williams ...................... | 294/1.5 |
| 2013/0291364 | A1 | 11/2013 | Blake | |

FOREIGN PATENT DOCUMENTS

EP        1 029 449        *   8/2000

* cited by examiner

*Primary Examiner* — Dean Kramer
(74) *Attorney, Agent, or Firm* — Z IP Law PLLC; Claire Zopf (57) ABSTRACT

An apparatus for the sanitary collection of dog waste using an extendable pole with a teardrop shaped loop supporting a plastic bag and a method of collecting dog waste by extending the pole and positioning the loop with the plastic bag under the butt of a dog while pooping to collect the dog's waste.

13 Claims, 10 Drawing Sheets

APPARATUS AND METHOD FOR THE SANITARY COLLECTION OF DOG WASTE

RELATED APPLICATION

This application is a continuation-in-part of U.S. patent application Ser. No. 14/133,326 filed Dec. 18, 2013 and entitled APPARATUS AND METHOD FOR THE SANITARY COLLECTION OF DOG WASTE which is herein incorporated by reference in its entirety.

FIELD OF THE INVENTION

The present invention is directed to an apparatus for the sanitary collection of dog waste using a versatile, extendable pole with a teardrop shaped wire loop supporting a plastic bag. The present invention is further directed to a method of collecting dog waste by extending the pole and positioning the teardrop shaped wire loop with plastic bag under the butt of a dog while pooping to collect the dog's waste.

BACKGROUND OF THE INVENTION

In many cities, there are laws requiring that dog waste be cleaned from city streets and parks and failure to do so may result in fines for the dog owner. Commonly, dog owners use plastic shopping bags and by placing a hand over one side of the bag and scoop around the excrement or poop with their hand. The bag must then be tied around the poop to be disposed of. This practice is unsanitary and at times difficult where all of the poop from the dog must at times be gathered within a single bag. What is not known is a method of catching the waste from the dog while the dog is pooping and a tool to easily clean up the dog waste from the ground once the dog has pooped. The dog waste catcher of the present invention provides a method and a versatile easy to use and carry apparatus for this task.

SUMMARY OF THE INVENTION

The present invention provides a versatile, effortless dog waste catcher that uses any number of types and sizes of plastic bags such as plastic grocery bags or produce bags, with or without handles that are commonly known. The present invention has an extendible pole with a teardrop shaped wire loop affixed to one end. The teardrop shape is a unique design feature to provide for the dog waste catcher to be placed and comfortably fit under the butt of both large and small dogs. The teardrop shaped loop may be of a rigid material such as a metal wire to retain the teardrop shape when lifting the dog waste.

In some embodiments, the pole may have a telescopic extension to more easily extend and position the wire loop below the butt of the dog. Then by collapsing, the pole is shortened for easier carrying and storage. The pole may be of wood, plastic or metal with a thickness in diameter acceptable to support the metal loop and dog waste. In further embodiments, the pole may be foldable with segments being connected using a stretchable line or rope providing for the dog waste catcher to be easily carried and used in a folded position for smaller dogs or extended to provide adequate reach for larger dogs. The foldable configuration may further provide for cleaning up waste that was not collected while the dog was pooping. The foldable pole may be made from hollow segments with the stretchable line that is affixed at one end of a beginning segment and that extends through other segments and through an end segment where line is also attached. The first segment may have the teardrop shaped wire loop attached. A removable shoulder strap may be attached to the opposing end from the wire loop with a second attachment point along the middle of the pole to have a dog owner insert one arm through the strap and easily support the dog waste catcher across the shoulder or be carried by the hand. In further embodiments, the dog waste catcher may have a wrist band for a user to insert their hand through and hold a hand grip making the dog waste catcher easy to carry.

The dog waste catcher includes at least two retaining fixtures that may be Velcro or other cloth hook and loop fasteners in the form of straps and/or retainer clips that are attached along the extendable pole at for example near the end having the teardrop shaped wire loop. A Velcro strap may be used to secure a plastic bag around the wire loop. For example a first Velcro strap may be positioned closer to the wire loop to secure smaller bags. A second Velcro strap may be positioned further from the loop to secure larger bags. Either of the Velcro straps may further secure additional plastic bags. One of the at least two retaining fixtures may be a retainer clip that may be positioned along the pole to hold additional bags or to secure plastic bags that do not have handles to the teardrop shaped wire loop.

One of the Velcro straps may further be used to secure a telescopic pole in a compressed configuration or to wrap around the segmented pole in a folded configuration and secure the segments together. The dog waste catcher of the present invention having at least two retaining fixtures is therefore a versatile tool by providing straps and/or clips to secure bags of various types and sizes, to secure additional bags to the pole, and/or to provide for the pole to be secured when compressed or folded to make the dog waste catcher easily transportable.

An object of the present invention is to provide an apparatus to catch the waste from a dog while pooping in a sanitary manner without soiling the hands of the dog owner.

A further object of the invention is a dog waste catching apparatus with a tear drop shaped loop to be placed and comfortably fit under the butt of both large and small dogs.

A further object of the invention is a dog waste catching apparatus with a tear drop shaped loop affixed at an angle of between 30 and 60 degrees to provide for a user to place the loop below the butt of a dog without bending or stooping down.

A further object of the invention is a dog waste catching apparatus with a telescopic pole to extend and properly position the wire loop with plastic bag below the butt of the dog that is pooping.

A further object of the invention is a dog waste catching apparatus with a foldable pole having segments attached using a stretchable line or rope where unfolding and aligning the segments extends the pole to properly position the wire loop with plastic bag below the butt of the dog that is pooping.

A further object of the invention is a removable shoulder strap that provides for carrying of the dog waste catcher without using the hands.

A further object of the invention is a wrist band for hanging or holding the dog waste catcher.

A further object of the invention is the use of at least one retaining fixture affixed to the pole to attach bags to the wire loop of the dog waste catcher.

A further object of the invention is the use of at least one retaining fixture affixed to the pole to attach bags of different sizes to the teardrop shaped wire loop of the dog waste catcher.

A further object of the invention is the use of at least one retaining fixture affixed to the pole to attach bags of different varieties to the teardrop shaped wire loop of the dog waste catcher.

A further object of the invention is the use of at least one retaining fixture affixed to the pole to secure the pole in a transportable configuration.

A further object of the invention is the use of at least two retaining fixtures affixed to the pole.

A further object of the invention is the use of one or more Velcro straps as retaining fixtures affixed to the pole.

A further object of the invention is the use of one or more retainer clips as retaining fixtures affixed to the pole.

A further object of the invention is the use of one or more Velcro straps and/or one or more retainer clips as retaining fixtures affixed to the pole.

A further object of the invention is the use of both a Velcro strap and retainer clip as retaining fixtures affixed to the pole to attach bags of different sizes to the teardrop shaped loop of the dog waste catcher.

A further object of the invention is the use of both a Velcro strap and retainer clip as retaining fixtures affixed to the pole to attach bags and secure additional bags to the dog waste catcher.

A further object of the invention is the use of both a Velcro strap and retainer clip as retaining fixtures affixed to the pole to attach bags of different sizes to the teardrop shaped loop of the dog waste catcher.

A further object of the invention is the use of one or more Velcro straps as retaining fixtures affixed to the pole to attach bags of different varieties to the loop of the dog waste catcher.

A further object of the invention is the use of one or more Velcro straps as retaining fixtures affixed to the pole to attach bags of different sizes to the loop of the dog waste catcher.

A further object of the invention is the use of one or more Velcro straps as retaining fixtures affixed to the pole to attach additional bags to the pole of the dog waste catcher to be used as needed.

A further object of the invention is the use of one or more Velcro straps as retaining fixtures affixed to the pole to secure a telescopic pole in a compressed configuration for carrying.

A further object of the invention is the use of one or more Velcro straps as retaining fixtures affixed to the pole to secure the segments of the pole together when folded for carrying or use.

A further object of the invention is the use of one or more retainer clips as retaining fixtures affixed to the pole to attach bags of different sizes to the teardrop shaped loop of the dog waste catcher.

A further object of the invention is the use of one or more retainer clips as retaining fixtures affixed to the pole to attach bags of different varieties to the teardrop shaped loop of the dog waste catcher.

A further object of the invention is the use of one or more retainer clips as retaining fixtures affixed to the pole to attach additional to the pole of the dog waste catcher to be used as needed.

The present invention is related to an apparatus for the collection of dog waste, comprising a pole; a loop attached to an end of the pole; at least two retaining fixtures affixed to the pole; and wherein one of the at least two retaining fixtures secures a plastic bag around the loop, the plastic bag is compressed to form a pocket and the loop and bag is positioned below the butt of a dog to collect waste from the dog while the dog is pooping.

One of the at least two retaining fixtures of the apparatus for the collection of dog waste may secure additional plastic bags to the apparatus for the collection of dog waste. One of the at least two retaining fixtures may be a cloth hook and loop fastener and the fastener may secure a plastic bag around the loop. One of the at least two retaining fixtures may be a cloth hook and loop fastener and the fastener in an open position may extend through at least one handle of the plastic bag and in a closed position secure the plastic bag around the loop. Further, one of the at least two retaining fixtures as a cloth hook and loop fastener and the fastener in an open position may secure additional plastic bags to the pole. The apparatus for the collection of dog waste may have a pole that is telescopic. One of the at least two retaining fixtures may be a cloth hook and loop fastener and the fastener in an open position may extend around the telescopic pole to secure the pole in a compressed configuration. The apparatus for the collection of dog waste may have a pole made of attached segments. One of the at least two retaining fixtures may be a cloth hook and loop fastener and the fastener in an open position may extend around the segmented pole to secure the pole segments together in a folded configuration. Further one of the at least two retaining fixtures of the apparatus for the collection of dog waste may be a retainer clip. The retainer clip may secure bags without handles around the loop. The retainer clip may secure additional bags to the pole. The apparatus for the collection of dog waste may further comprise a shoulder strap. The apparatus for the collection of dog waste may further comprise a wrist band. The apparatus for the collection of dog waste may have a pole that has a first extension piece that slides within a second extension piece to adjust the length of the pole by pulling the first extension piece in or out of the second extension piece.

The present invention is further related to an apparatus for the collection of dog waste, comprising a pole; a loop attached to an end of the pole; at least one retaining fixture affixed to the pole; and wherein the at least one retaining fixture secures a plastic bag around the loop, the plastic bag is compressed to form a pocket and the loop and bag is positioned below the butt of a dog to collect waste from the dog while the dog is pooping. The loop of the apparatus for the collection of dog waste may be teardrop shaped. The pole of the apparatus for the collection of dog waste may be made of attached segments.

The present invention is further related to a method of collecting dog waste comprising the steps of holding a pole having at least two retaining fixtures; opening the one of the at least two retaining fixtures; securing a plastic bag over a loop using the one of the at least two retaining fixtures; forming a pocket within the plastic bag by pushing the plastic bag down through the loop; placing the loop with the bag-pocket under the butt of a dog; and catching the waste. The method of collecting dog waste may further comprise the steps of removing the plastic bag with waste by opening the one of the at least two retaining fixtures; pulling the plastic bag with waste off from around loop; and discarding the plastic bag with waste. The method of collecting dog waste may have one of the at least two retaining fixtures as a cloth hook and loop fastener and may further comprise the step of securing a bag to the loop using the cloth hook and loop fastener. The method of collecting dog waste of may have one of the at least two retaining fixtures as a retainer clip and may further comprise the step of securing a bag without handles to the loop using the retainer bag clip. The method of collecting dog waste may have one of the at least two retaining fixtures as a cloth hook and loop fastener and may further comprise the steps of forming the pole as attached segments; and securing the segments of the pole in a folded configuration together using one of the at least two retaining fixtures.

The present invention is further related to a method of collecting dog waste that comprises the steps of holding the pole with the bag retainer clip and Velcro strap facing upwards; opening the Velcro strap; placing a plastic bag over the metal loop with one handle of the plastic bag facing downwards; gripping the handle facing downwards and pulling it up through the metal loop; securing both handles onto the opened Velcro strap; closing the Velcro strap over both of the handles to attach the bag around and over the loop; forming a pocket within the plastic bag by pushing the plastic bag down through the loop; placing the loop with the bag-pocket under the butt of a dog; catching the waste. The method of collecting dog waste further comprises the steps of removing the plastic bag with waste by opening the Velcro strap; pulling the plastic bag with waste off from around loop and discarding the plastic bag with waste. The method of collecting dog waste of the present invention further comprises the step of attaching a bag without handles to the retainer bag clip instead of the Velcro strap.

These and other features, advantages and improvements according to this invention will be better understood by reference to the following detailed description and accompanying drawings.

BRIEF DESCRIPTION OF THE DRAWINGS

Several embodiments of the present invention will now be described by way of example only, with reference to the accompanying drawings in which.

DETAILED DESCRIPTION OF THE DRAWINGS

Figure 1:
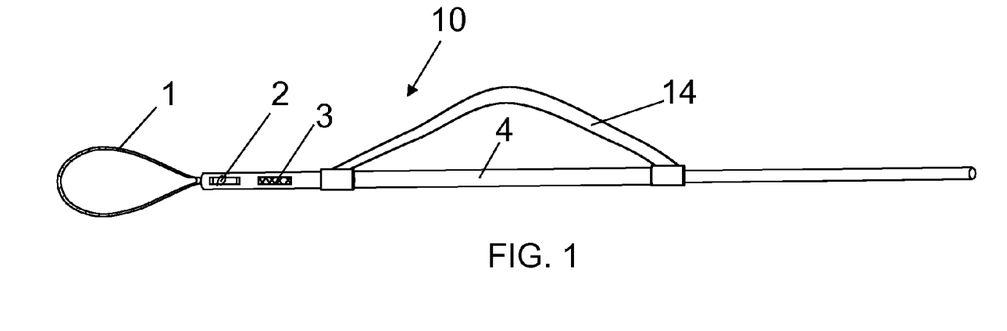
FIG. 1 is a top view of an embodiment of the apparatus for the collection of dog waste.

As shown in FIG. 1, the apparatus for collecting dog waste 10 includes a teardrop shaped wire loop 1 that is made of metal or of another resilient material that has sufficient structural elements to retain the teardrop shape when attached to the end of a pole 4 with reasonable support to collect and hold the dog waste. The pole 4 may be of plastic, metal, or other lightweight but strong material to support the teardrop shaped loop 1 and the dog waste. The base 9 of the loop 1 may be affixed to the pole 4 using a bolt and nut (not shown), an adhesive or other fastener to securely attach the teardrop shaped loop 1 to the pole 4. In an embodiment of the dog waste catcher 10, at least two retaining fixtures are affixed to the pole. A first retaining fixture may be a retainer clip 2, similar in style to a clothes pin that has upper and lower jaws 7 that rotate around a pivot point 8. By pressing a first end of the clip 2, the jaws 7 open and a plastic bag that has been positioned around the loop 1 may be inserted between the jaws 7 and by closing the clip 2, the bag may be secured to the pole 4. Using this retainer clip 2 a plastic bag 12 and particularly bags without handles may be affixed to the pole 4. The retainer clip 2 may further secure additional bags to the pole to be used as needed. The clip 2 may be of metal or plastic to properly retain and secure a plastic bag or a number of additional bags to the pole 4.

Figure 5:
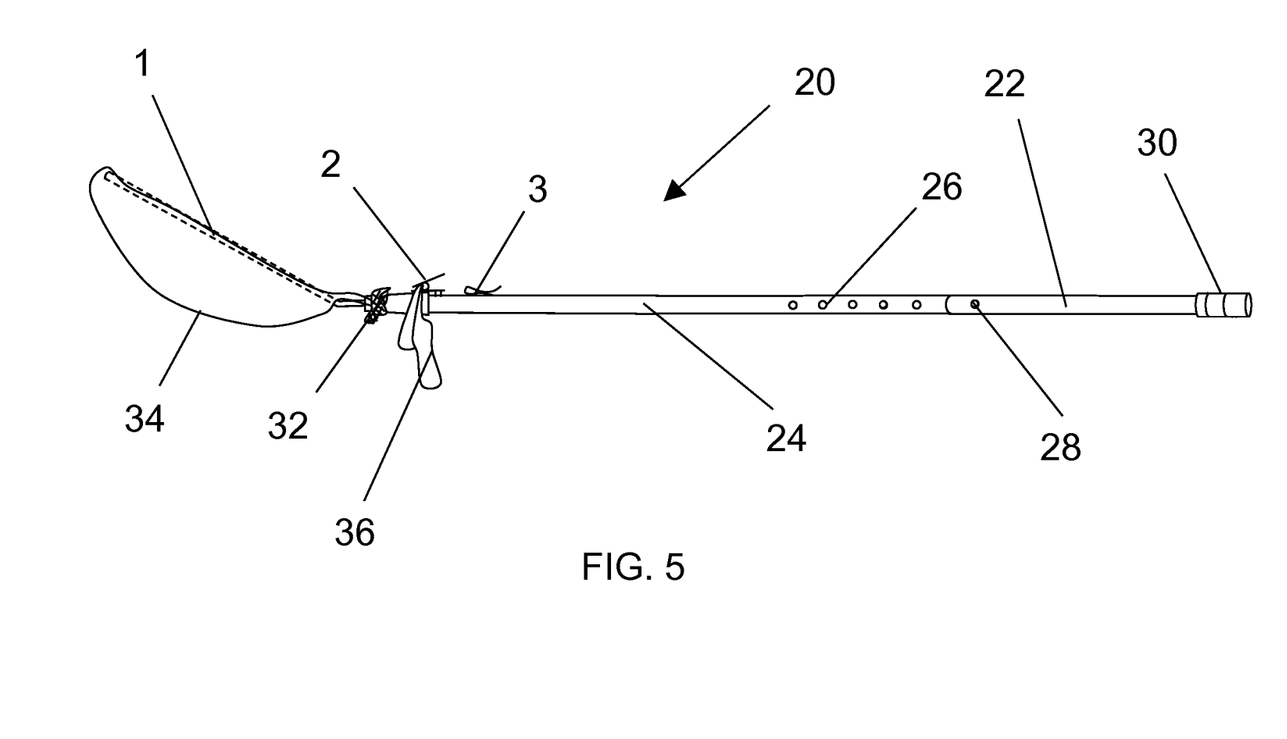
FIG. 5 is a side elevation view of the further embodiment of the apparatus for the collection of dog waste with a small bag attached.

A second retaining fixture may be a fastening strip 3 of Velcro or other hook and loop cloth fastener that may have a portion of the strip 3 adhered to the pole 4 using adhesive, glue, epoxy or another fastening process or fixture. The non-adhered portion of the strip 3 may then fold over onto the adhered portion and attach using the hook and loops of the fastener. By placing a plastic bag 12 around the loop 1 and positioning one or both handles of the plastic bag over the adhered portion of the fastening strip 3, the non-adhered portion may be pulled over the bag handle or handles to secure the bag to the pole 4. In an embodiment, having at least two retaining fixtures provides for the first retaining fixture as a retainer clip 2 to provide for securing smaller bags and bags without handles where the retainer clip may be positioned closer to the teardrop shaped loop than a second retaining fixture as a fastening strip 3 providing for the attachment of larger bags with either of the two retaining fixtures available to secure additional bags 36 as shown in FIG. 5.

The pole 4 may further include a first extension piece 6 that is inserted into a second extension piece 5 to form the pole 4 as a telescopic pole that may be shortened for carrying and storage and extended for positioning under the butt of a dog to collect waste. A shoulder strap 14 may further be attached along a portion of the pole 4 and be positioned to properly balance the pole 4 over a shoulder, or alternatively, the strap 14 may be of a smaller dimension and serve as a handle for carrying the dog waste catcher 10.

Figure 2A:
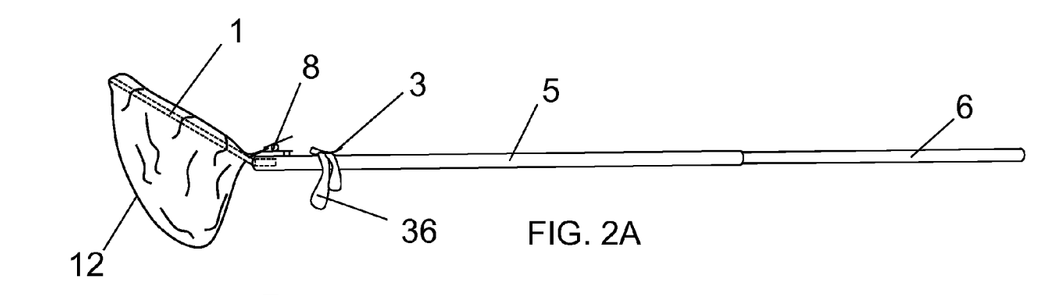
FIG. 2A is a side elevation view of an embodiment of the apparatus for the collection of dog waste in an extended position.
Figure 2B:
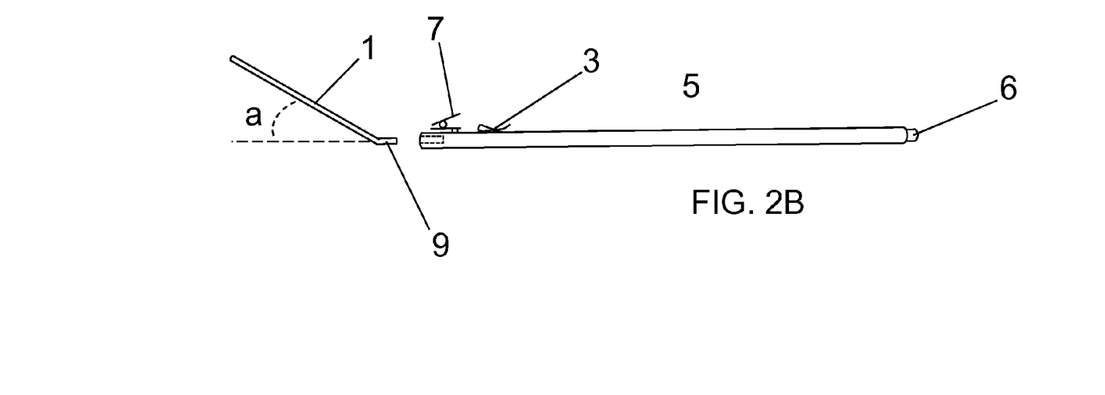
FIG. 2B an exploded view of an embodiment of the apparatus for the collection of dog waste in a retracted position.
Figure 3:
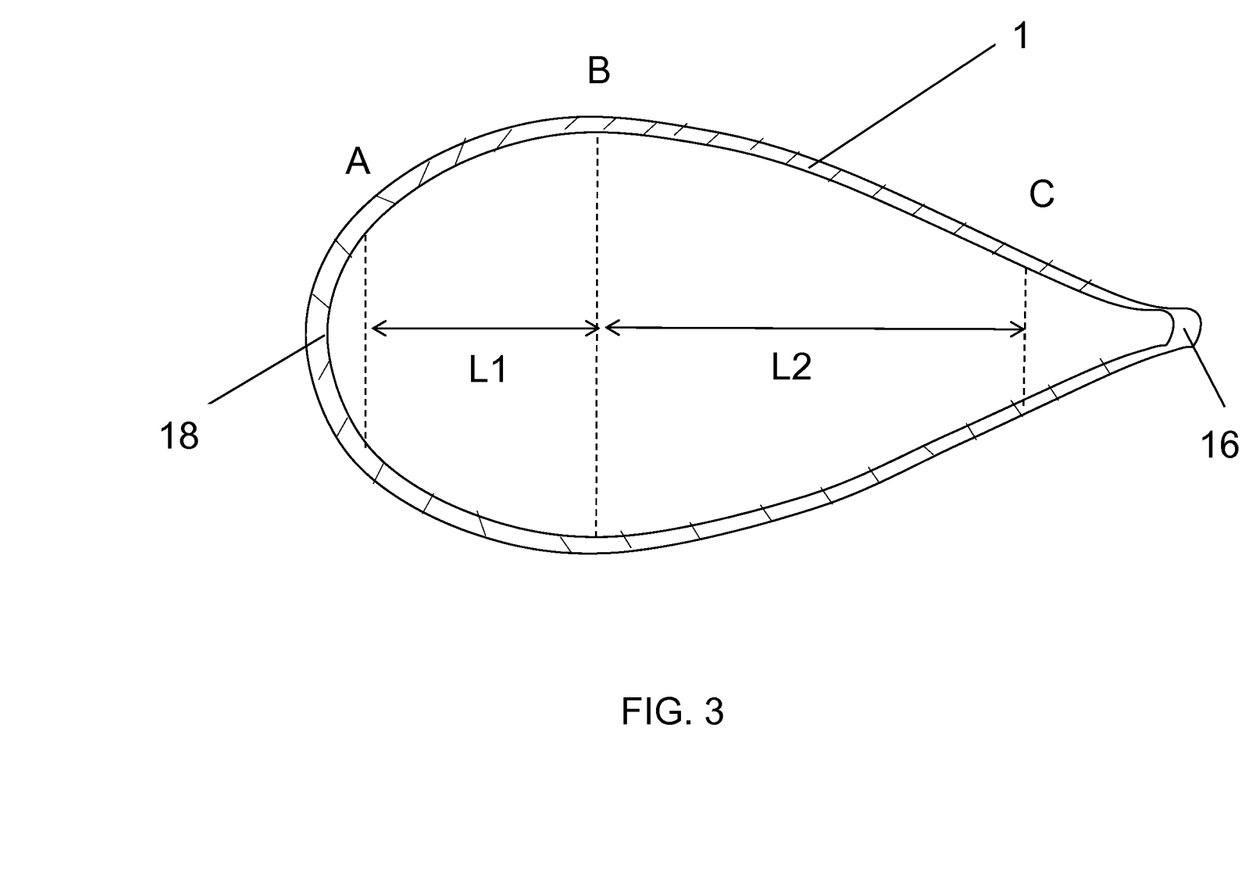
FIG. 3 is a top view of an embodiment of a teardrop shaped loop in an embodiment of the apparatus for the collection of dog waste.

In an embodiment as shown in FIGS. 2A and 2B the loop 1 may be affixed at an angle a of between 30 and 60 degrees to more easily position the loop 1 below the butt of the dog and capture the waste within the plastic bag 12. The loop 1 at an angle is an important feature of the present invention providing for an elderly or infirmed user to not have to bend down to position the teardrop shaped loop 1 below the butt of a dog. The teardrop shaped loop 1 is also an important feature of the present invention as shown in FIG. 3. The teardrop shape loop 1 has an attachment point or fixture 16 to attach the loop 1 to the pole 4. The teardrop shape is formed with a largest dimension B that is narrow enough to be inserted between the legs of most dogs. The rounded end 18 that is inserted between the dog's legs has a shorter dimension A with the loop 1 being formed with a shorter distance L1 to the largest dimension B and then a longer distance L2 to the smallest dimension C at the attachment point 16. In this way, the loop 1 is formed not as an ellipse that would have L1 and L2 as equal distances but instead as a teardrop with a much shorter distance of L1 of roughly ⅓ to ½ of the distance of L2. The teardrop shape minimizes the length of dimension A and dimension B provides for a more extended portion of the loop 1 to be inserted below and without interfering with the legs of a dog while still provide a large exposed surface area of the plastic bag 12 to catch the waste.

Figure 4:
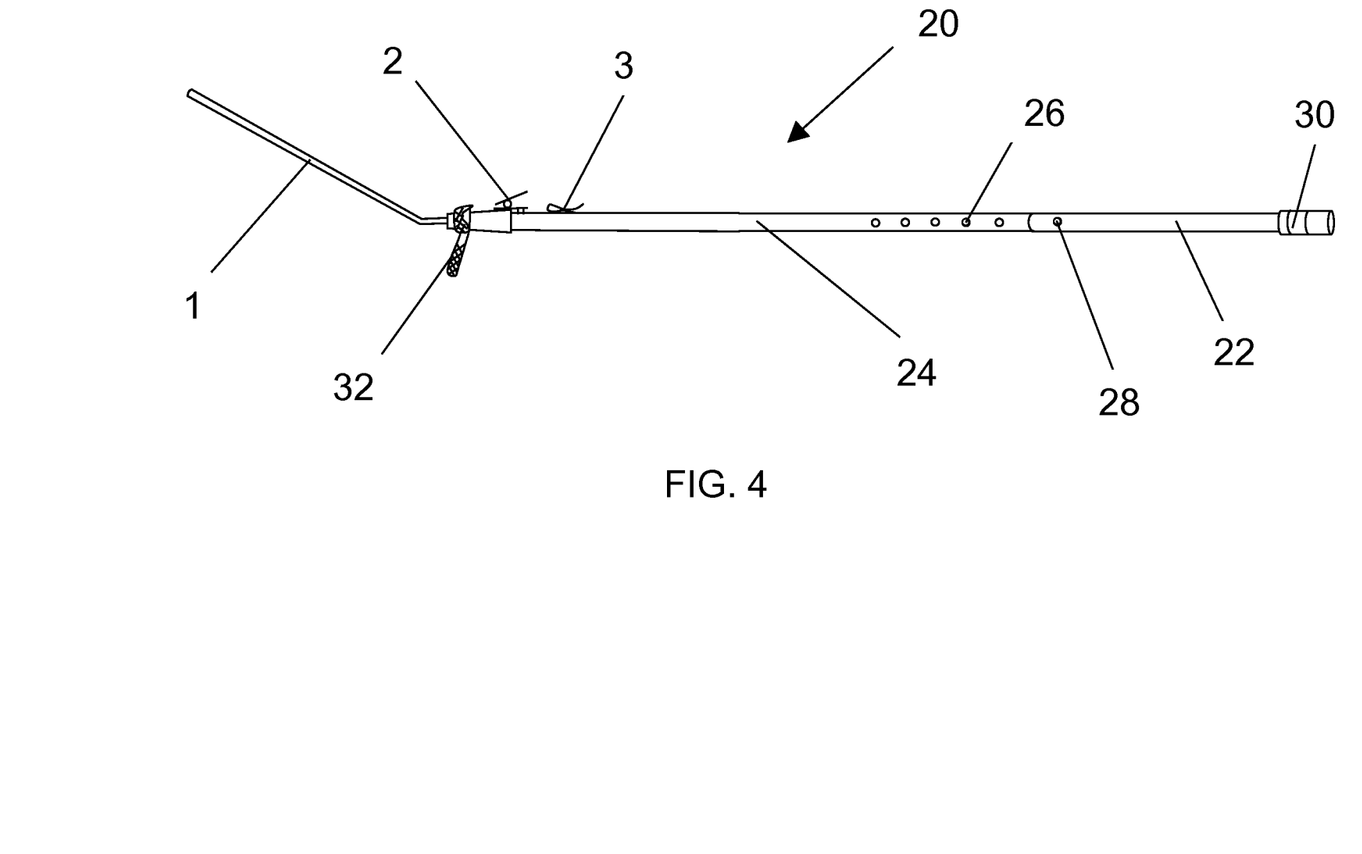
FIG. 4 is a side elevation view of a further embodiment of the apparatus for the collection of dog waste.

In a further embodiment of the dog waste catcher 20 as shown in FIG. 4, the pole may be a telescopic pole that is formed from an extension tube 22 inserted into a hollow shaft 24 having openings 26. The extension tube 22 may have one or more flexible protrusions 28 that collapse into the extension tube 22 as it is inserted into the hollow shaft 24. As the extension tube 22 is slid into the shaft 24, the protrusions 28 flex outward and extend into the openings 26 to lock the extension tube 22 in place at a specific length. The extension tube 22 may be completely slid into the shaft 24 in a compressed configuration to provide for the dog waste catcher 20 to be at its shortest length to easily carry and transport the dog waste catcher 20. The extension tube 22 may have a grip 30 that acts as a stopper against the upper edge of the shaft. The grip 30 may also provide a cushioned or contoured textured surface for a user to hold and pull the extension tube 22 out of the shaft 24 to a fully extended position to be used to position under a dog's legs and collect waste.

Figure 6:
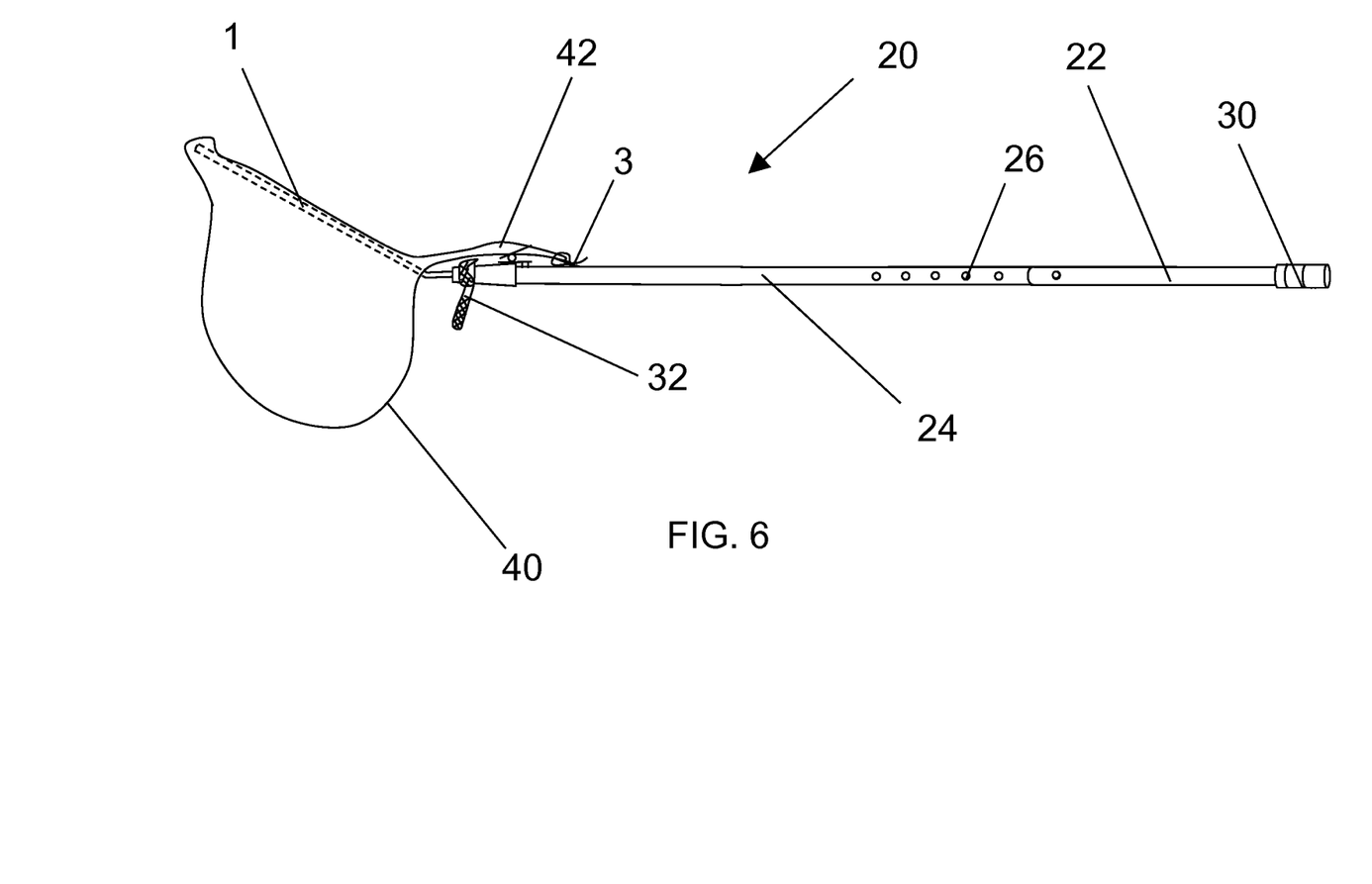
FIG. 6 is a side elevation view of the further embodiment of the apparatus for the collection of dog waste with a large bag attached.
Figure 7:
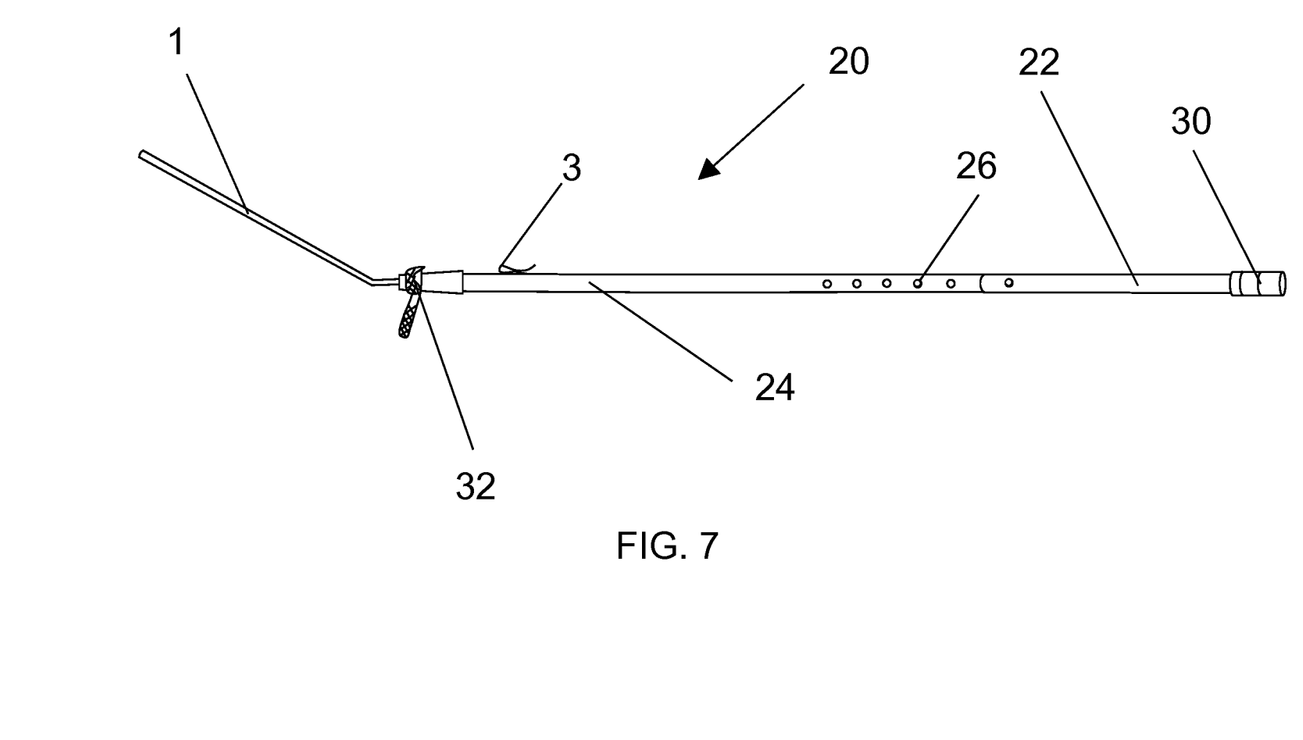
FIG. 7 is a side elevation view of a further embodiment of the apparatus for the collection of dog waste.

In an embodiment of the present invention, as shown in FIG. 4 the retaining fixtures may include a retainer clip 2, a fastening strip 3, and a second fastening strip 32 that is positioned very close to the attachment point 16 of the teardrop shaped loop 1. A retaining fixture close to the attachment point 16 provides for even very small produce bags 34 to be used for the collection of waste as shown in FIG. 5. The retainer clip 2 as a retaining fixture as shown in FIG. 5 provides for additional bags 36 to be secured to the shaft 24 to have available for a user as needed. The other fastening strip 3 provides for a larger bag 40 to be secured over the teardrop shaped loop 1 as shown in FIG. 6. The larger bag 40 may have a handle 42 that is laid across the open fastener 3 and then secured by closing the fastener 3. By using at least two retaining fixtures the dog waste catcher 20 has many options for the attachment for bags of different sizes and varieties and to attach additional bags 36 to use as needed. In further embodiments as shown in FIG. 7, the retaining fixtures may be only fastening strip 3 and fastening strap 32 with one provided for securing a plastic bag 12 around the teardrop shaped loop 1 and the other securing additional bags 36 for example. Alternatively, the retaining fixtures could be at least two retainer clips 2 to secure the plastic bag 12 and additional bags 36 and/or in further embodiments both retainer clips and fastening straps.

Figure 8:
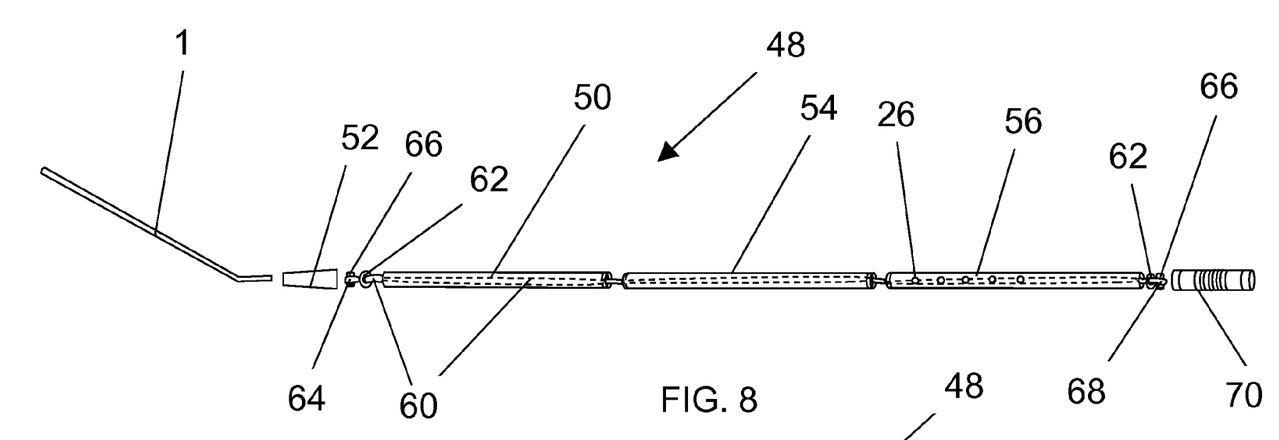
FIG. 8 is a an exploded view of a still further embodiment of the apparatus for the collection of dog waste.
Figure 9:
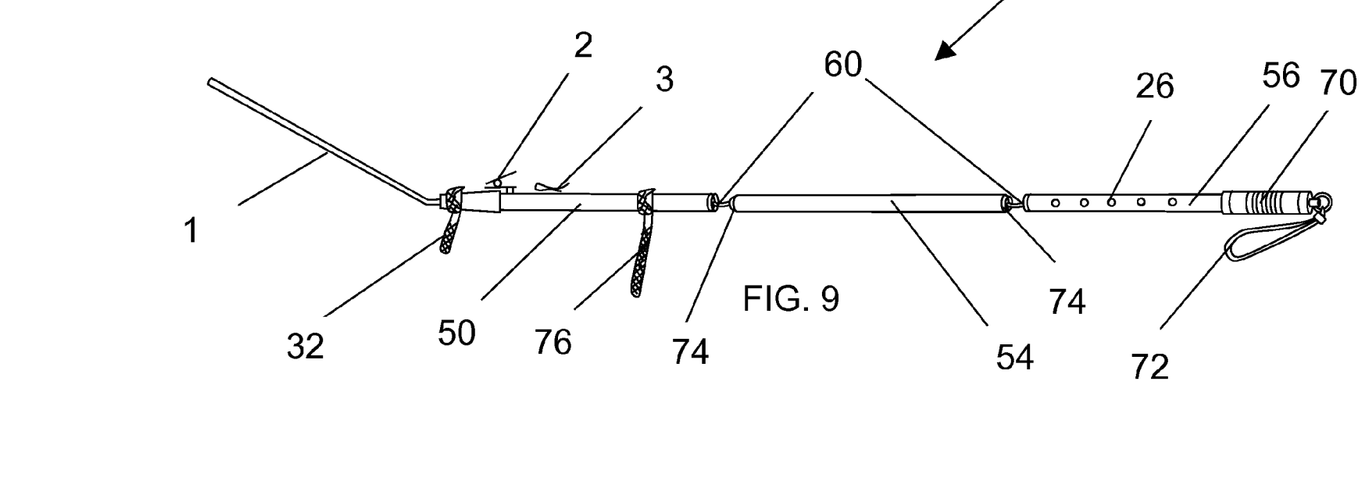
FIG. 9 is a side elevation view of the still further embodiment of the apparatus for the collection of dog waste.
Figure 10:
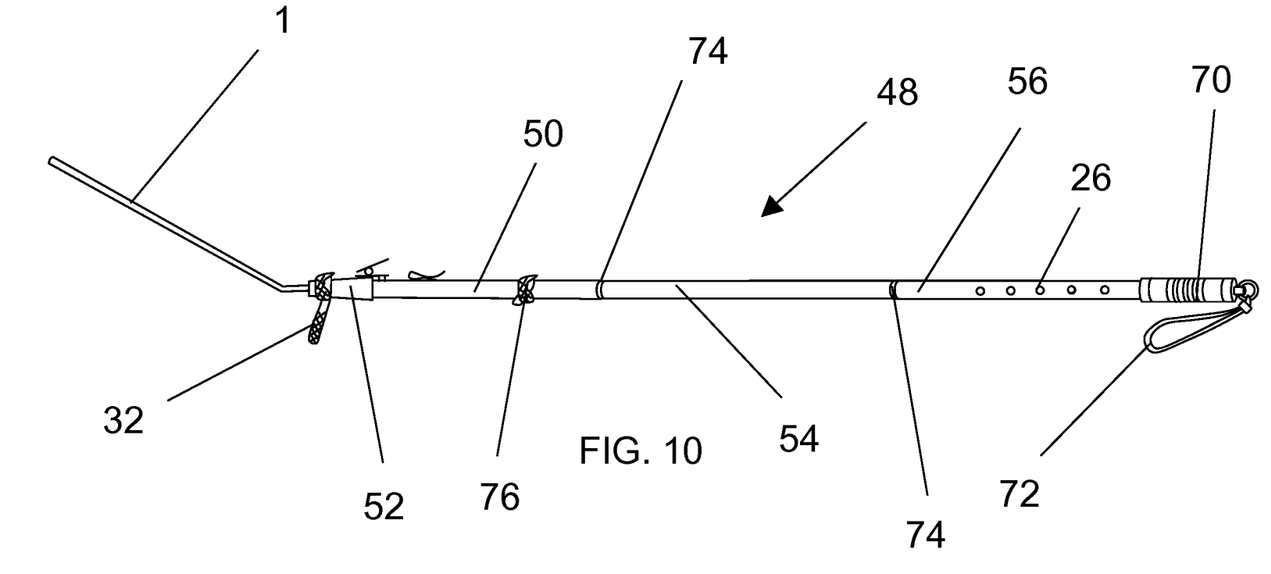
FIG. 10 is a side elevation view of the still further embodiment of the apparatus for the collection of dog waste in an extended position.
Figure 11:
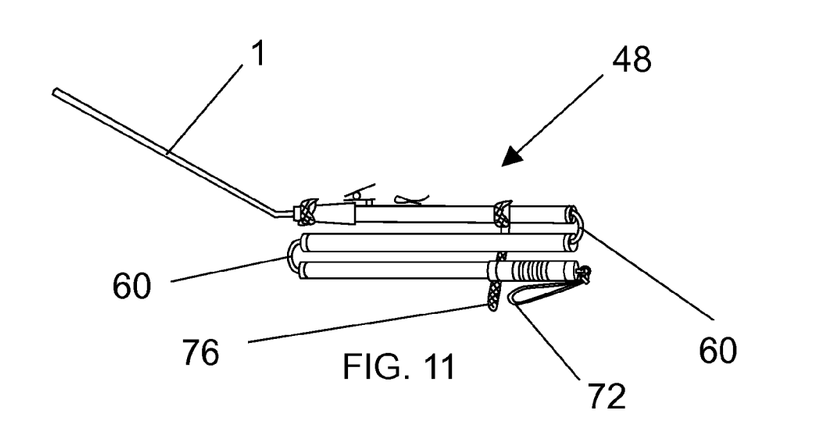
FIG. 11 is a side elevation view of the still further embodiment of the apparatus for the collection of dog waste in a folded configuration.
Figure 12:
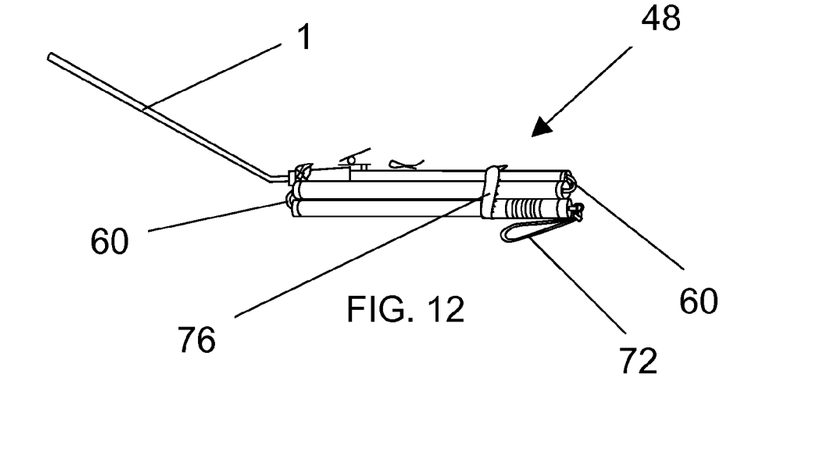
FIG. 12 is a side elevation view of the still further embodiment of the apparatus for the collection of dog waste in a folded configuration.
Figure 13:
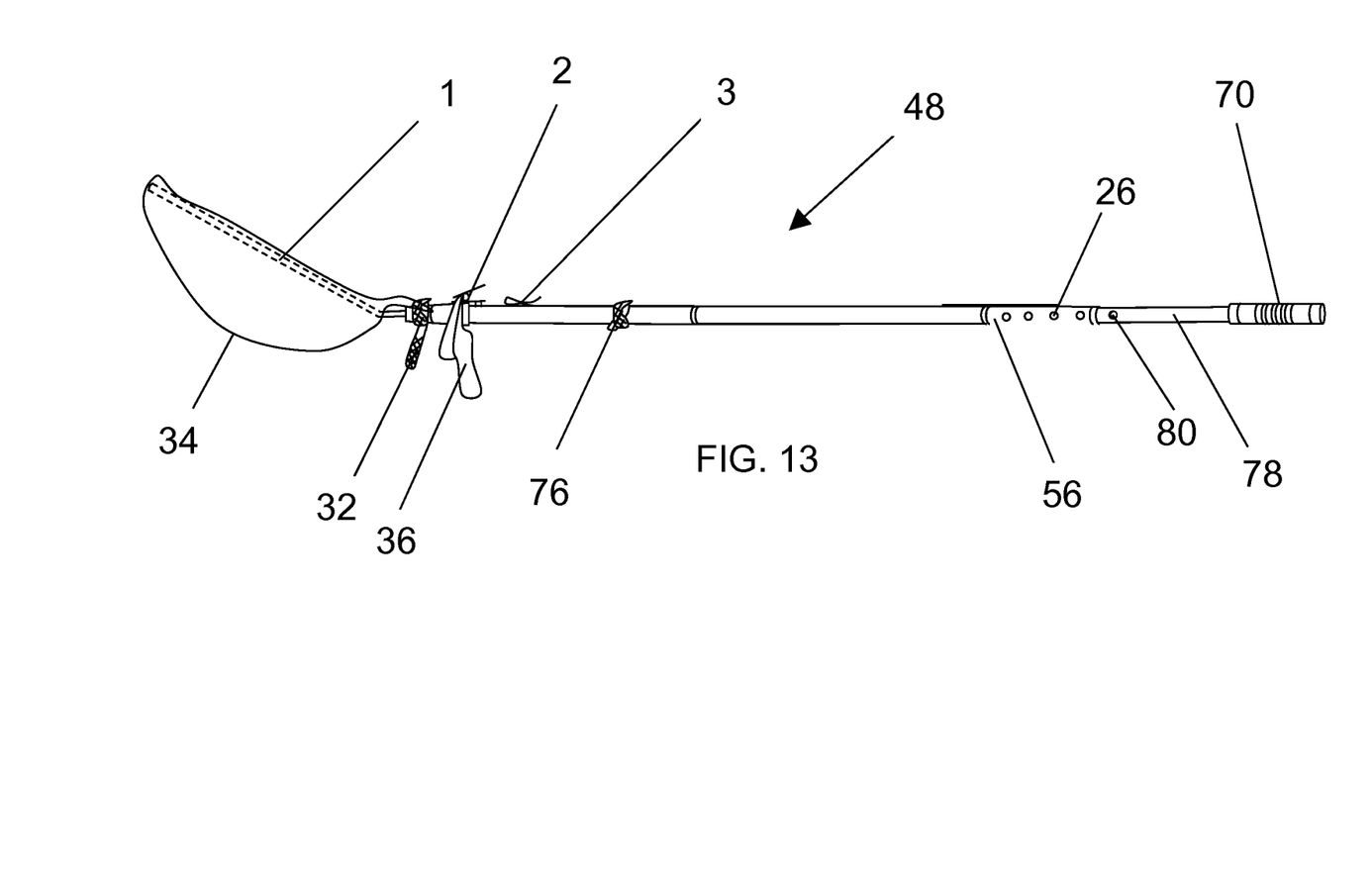
FIG. 13 is a side elevation view of the still further embodiment of the apparatus for the collection of dog waste in an extended position.

In a further embodiment, the dog waste catcher 48 is formed as segments of hollow shafts as shown in FIG. 8. The teardrop shaped wire loop 1 may be affixed to a first hollow segment 50 using a collar 52 that supports and assists in attaching the loop using an adhesive or other attachment fixture to secure the loop 1 to the segment 50. The first hollow segment 50 is aligned with a middle segment 54 and an end segment 56 with all three segments having a stretchable line or rope 60 inserted through each hollow segment. The stretchable line 60 is inserted through a washer 62 at each end 64 and is then attached to a dowel 66 that abuts against the washer 62 to secure and attach the line 60 at each end 68 of the first segment 50 and end segment 56. A lengthened grip 70 may be affixed over the dowel 66 and washer 62 to secure the attachment of the line 60 to the end segment 56. A wrist band 72 may be attached to the grip 70 to make it easy to hold and carry the dog waste catcher. The collar 52 may be installed over the dowel 66 and washer 62 to secure the attachment of the line 60 to the first segment 50. The stretchable line 60 provides for the segments to be pulled apart but remain attached to align the segments. The middle segment 54 may have tapered ends 74 to provide for the ends of the first segment 50 and the end segment 56 to be inserted over the tapered ends 74 of the middle segment 54 to align the segments to form the pole in an extended position. Alternatively, the end of any one segment may be flared and the end of the mating segment tapered to have the segments align and interlock. The segments once aligned are inserted one into the other to form a rigid shaft for the dog waste catcher 48, as shown in FIG. 10. A retaining fixture in the form of a fastening strap 76 may be attached to a segment so that when a segment is pulled apart from another segment and the segments are folded over on one another as shown in FIG. 11 to make the dog waste catcher 48 smaller for carrying. The fastening strap 76 may be wrapped around the segments to hold the segments together as shown in FIG. 12 and allow a user to carry the dog waste catcher 48 by gripping around the segments or by holding the wrist band 72 for example. The dog waste catcher 48 may be lightweight and the diameters of the segments narrow enough to provide for dog waste catcher 48 to be easily held in one hand and be used in the folded configuration by grasping the dog waste catcher 48 around the segments and placing the teardrop shaped loop under the butt of a dog to collect waste. Alternatively, the folded configuration may provide for a user to scoop and clean up waste from the ground in cases where the waste was not collected from the dog while pooping. In further embodiments, as shown in FIG. 13, an extendable segment 78 may be provided with a flexible protrusion 80 to extend and lock into an opening 26 in the end segment 56 of the dog waste catcher 48. The extendable segment 78 may collapse into the end segment 56 in the foldable configuration but be available for extension if needed particularly when the dog waste catcher 48 is used to scoop up waste in a folded configuration.

Once extended the extendable segment 78 may provide an additional reach where needed to insert the loop 1 under a dogs legs while pooping. A smaller bag 34 for example may pulled over the teardrop shaped loop and be attached by winding the fastening strip 32 around the bag. The other retaining fixtures such as retainer clip 2 may be used to secure additional bags 36 to the dog waste catcher 48. Another retaining fixture as a fastening strip 3 may be available to secure larger bags to the dog waste catcher 48 and another fastening strip 76 may be of an extended length to wrap around the segments in a folded configuration to secure the segments together for easy carrying of the dog waste catcher 48. By using a number of retaining fixtures, the present invention provides a versatile tool that as shown in the different embodiments is easy to use and greatly assists a dog owner in providing a sanitary apparatus and method for the collection of waste from a dog.

The invention has been described in detail with particular reference to certain preferred embodiments thereof, but it will be understood that variations and modifications can be effected within the spirit and scope of the invention.

What is claimed is:
1. An apparatus for the collection of dog waste, comprising:
   a pole;
   a loop attached to an end of the pole;
   at least two retaining fixtures affixed to the pole;
   and wherein one of the at least two retaining fixtures secures a plastic bag around the loop, the plastic bag is compressed to form a pocket and the loop and bag is positioned below the butt of a dog to collect waste from the dog while the dog is pooping;

wherein one of the at least two retaining fixtures is a cloth hook and loop fastener and the fastener in an open position extends through at least one handle of the plastic bag and in a closed position secures the plastic bag around the loop; and wherein one of the at least two retaining fixtures is a cloth hook and loop fastener and the fastener in a closed position secures additional plastic bags to the pole.

2. The apparatus for the collection of dog waste of claim 1 wherein the pole is telescopic.

3. The apparatus for the collection of dog waste of claim 2 wherein one of the at least two retaining fixtures is a cloth hook and loop fastener and the fastener in an open position extends around the telescopic pole to secure the pole in a compressed configuration.

4. The apparatus for the collection of dog waste of claim 1 wherein the pole is made of attached segments.

5. The apparatus for the collection of dog waste of claim 4 wherein one of the at least two retaining fixtures is a cloth hook and loop fastener and the fastener in an open position extends around the segmented pole to secure the pole segments together in a folded configuration.

6. The apparatus for the collection of dog waste of claim 1 wherein one of the at least two retaining fixtures is a retainer clip.

7. The apparatus for the collection of dog waste of claim 6 wherein the retainer clip secures bags without handles around the loop.

8. The apparatus for the collection of dog waste of claim 6 wherein the retainer clip is used to secure additional bags to the pole.

9. The apparatus for the collection of dog waste of claim 1 wherein the loop is teardrop shaped.

10. A method of collecting dog waste comprising the steps of:
holding a pole having at least two retaining fixtures;
opening one of the at least two retaining fixtures;
securing a plastic bag over a loop using the one of the at least two retaining fixtures;
forming a pocket within the plastic bag by pushing the plastic bag down through the loop;
placing the loop with the bag-pocket under the butt of a dog; and
catching the waste; and
wherein one of the at least two retaining fixtures is a cloth hook and loop fastener and the fastener in an open position extends through at least one handle of the plastic bag and in a closed position secures the plastic bag around the loop; and
wherein one of the at least two retaining fixtures is a cloth hook and loop fastener and the fastener in a closed position secures additional plastic bags to the pole.

11. The method of collecting dog waste of claim 10 further comprising the steps of:
removing the plastic bag with waste by opening the one of the at least two retaining fixtures;
pulling the plastic bag with waste off from around loop; and
discarding the plastic bag with waste.

12. The method of collecting dog waste of claim 10 wherein one of the at least two retaining fixtures is a retainer clip and further comprising the step of securing a bag without handles to the loop using the retainer clip.

13. The method of collecting dog waste of claim 10 further comprising the steps of:
forming the pole as attached segments; and
securing the segments of the pole in a folded configuration together using one of the at least two retaining fixtures.

* * * * *